(12) United States Patent  
Oka

(10) Patent No.: US 6,747,430 B2
(45) Date of Patent: Jun. 8, 2004

(54) CONTROL METHOD FOR SERVOMOTOR IN INJECTION MOLDING MACHINE

(75) Inventor: Keijiro Oka, Aichi-ken (JP)

(73) Assignee: Kabushiki Meiki Seisakusho, Aichi-ken (JP)

( * ) Notice: Subject to any disclaimer, the term of this patent is extended or adjusted under 35 U.S.C. 154(b) by 0 days.

(21) Appl. No.: 10/133,434

(22) Filed: Apr. 29, 2002

(65) Prior Publication Data

US 2002/0158598 A1 Oct. 31, 2002

(30) Foreign Application Priority Data

Apr. 27, 2001 (JP) ....................................... 2001-130738

(51) Int. Cl.⁷ ............................................. G05B 11/01
(52) U.S. Cl. ........................ 318/560; 318/600; 318/602; 425/150; 425/162
(58) Field of Search ................................ 318/560, 567, 318/569, 600, 602, 625; 425/149, 150, 151, 162

(56) References Cited

U.S. PATENT DOCUMENTS

| | | | | |
|---|---|---|---|---|
| 4,785,221 A | * | 11/1988 | Neko | .......................... 318/311 |
| 4,806,089 A | * | 2/1989 | Neko | .......................... 425/145 |
| 4,970,447 A | * | 11/1990 | Kamiguchi et al. | ......... 318/567 |
| 5,235,262 A | * | 8/1993 | Takeuchi et al. | ............ 318/603 |
| 5,552,690 A | * | 9/1996 | Hiraoka | ....................... 318/632 |
| 5,639,486 A | * | 6/1997 | Yamaguchi | ................... 425/139 |
| 6,188,190 B1 | * | 2/2001 | Arakawa | ..................... 318/560 |
| 6,211,639 B1 | * | 4/2001 | Meister et al. | ........... 318/568.2 |
| 6,514,065 B2 | * | 2/2003 | Usui et al. | .................. 425/162 |

* cited by examiner

*Primary Examiner*—Rina Duda
(74) *Attorney, Agent, or Firm*—Browdy and Neimark

(57) ABSTRACT

In a method for controlling a servomotor in an injection molding machine having a servo amplifier which outputs a driving current 16 according to a command signal 15 transmitted from a control device 1 and a servomotor 8 having an encoder 9 which is driven by the driving current 16, the encoder 9 transmits angular displacement data 13, 14 to the encoder 9 according to a request command supplied from the control device 1. The control device transmits a command signal 15 calculated based on the received angular displacement data 14 to the servo amplifier 6.

2 Claims, 4 Drawing Sheets

CONTROL METHOD FOR SERVOMOTOR IN INJECTION MOLDING MACHINE

BACKGROUND OF THE INVENTION

1. Field of the Invention

The present invention relates to a control method for an injection molding machine, wherein a moving member is driven by a servomotor and the position and the speed of the moving member are detected by an encoder in the servomotor.

2. Description of Related Art

FIG. 3 shows a known servomotor control system and FIG. 4 is an explanatory view of an example of the control state thereof. Numeral 1 designates a control device for controlling the displacement, the moving speed, the rotating speed or the force of a moving member, such as a movable plate or a screw, of an injection molding machine, driven by a servomotor 8, to predetermined values. The control device 1 is provided with a human machine interface (HMI) 2 which sets the predetermined values or indicates measurements of the moving member or messages, a process controller 3 related to the control of the servomotor 8, a sequence controller (not shown) and a temperature controller (not shown). The process controller 3 further includes a servo controller 4 and an integrated circuit (ASIC) 5 for specific purposes for each servomotor. After the ASIC 5 converts angular displacement data 10 of a serial signal of an encoder 9 transferred from the ASIC 7 of a servo amplifier 6 into parallel angular displacement data which is compared with a predetermined value for controlling the servomotor 8, the servo controller 4 outputs a command signal 15, which is calculated and generated to control the servomotor 8 in a closed-loop system, to a servo amplifier 6. This arithmetic operation is performed using a program, for each process cycle determined by a clock frequency of a microprocessor which constitutes the servo controller 4. The servo amplifier 6 is a conventional servo amplifier which outputs a driving current 16 of the servomotor 8, and transmits a request command 12 to the encoder 9 at each process cycle which is determined by a clock frequency of a microprocessor mounted on the servo amplifier 6, and receives an angular displacement data 13 of the servomotor 8 in a serial transfer fashion. The ASIC 7 of the servo amplifier 6 converts the transferred serial angular displacement data into parallel angular displacement data which is compared with the command signal 15, and the servo amplifier 6 performs an arithmetic operating process in a positional closed-loop system. After that, the servo amplifier 6 feedsback the current and amplifies the electric power to obtain a driving current 16.

An example using the control system of the prior art, as mentioned above is described with reference to numerical values in FIG. 4. A graph 23 represents an angular displacement data train of the servomotor 8, fetched by the servo amplifier 6 by transmitting the request command 12 from the ASIC 7 to the encoder 9 every 1 millisecond. A graph 24 represents the angular displacement data train of the servomotor 8, received in the control device 1 (the servo controller 4) from the servo amplifier 6 through the ASICs 5 and 7 at each process cycle (which is 2.5 millisecond in this example). Whenever the angular displacement data is received, the control device 1 (the servo controller 4) calculates a rotating speed, based on a difference between the present data and the previous data, i.e., an angular displacement and the period of time therefor. For example, in the graph 23, it is assumed that the data is updated every 1 millisecond and the servomotor 8 rotates by $\frac{1}{100}$ cycle in 1 millisecond. On this assumption, because the data in the graph 23 is updated twice with respect to the previous updating, the rotation of $\frac{2}{100}$ cycle occurs in 2.5 millisecond, and therefore, the rotating speed at an update time 26 in the graph 24 is given by $(2 \times 1000 \times 60)/(100 \times 2.5) = 480$ rpm. Likewise, because the data in the graph 23 is updated three times with respect to the previous updating, the rotation of $\frac{3}{100}$ cycle takes place in 2.5 millisecond, and hence the rotating speed at an update point 27 in the graph 24 is given by $(3 \times 1000 \times 60)/(100 \times 2.5) = 720$ rpm. The above operations are repeated and the rotating speed signal 25 of the servomotor 8 calculated by the control device 1 changes oscillatingly in spite of the fact that an actual rotating speed is constant.

In the above description, when the actual rotating speed of the servomotor 8 is assumed to be constant, the rotating speed signal oscillates. But because the angular displacement changes, the rotating speed which is actually calculated by the control device 1 repeats an oscillation more complex than that shown in the graph 25. Although, in the above discussion, there is a large difference in the processing speed between the ASIC 7 and the control device 1 so that the ASIC 7 sends the request command 12 to the encoder 9 at an interval of 1 millisecond and the control device 1 receives the angular displacement data at a processing cycle of 2.5 millisecond, even if the both the ASIC 7 and the control device 1 update the data at same specification and processing speed, the actual processing speeds are different from each other because the processors operate at different clock frequencies. Thus, if the cycle is prolonged, the rotating speed data changes oscillatingly.

Because the servo controller 4 operates and generates the command signal 15 for controlling the servomotor 8 in a closed-loop system using the rotating speed data which oscillates as mentioned above compared with a predetermined value for controlling the servomotor 8, and outputs the command signal 15 to the servo amplifier 6. Consequently, if the predetermined value for controlling does not change oscillatingly, the command signal 15 fluctuates irregularly, and, hence, the servomotor 8 repeats the hunting without revolving smoothly. Consequently, a ball screw and a ball nut to drive the moving member by the servomotor 8 oscillate, thus resulting in production of noise and causing a reduced lifetime.

In particular, this problem becomes serious when the moving member is driven by a plurality of servomotors 8, ball screws and ball nuts. That is, in the conventional control method in which the plural servomotors 8 oscillate at different cycles, each servomotor 8 cannot revolve synchronously in the process, and damage such as abnormal wear, which would not be caused in an arrangement of a single ball screw and a single ball nut, occur.

SUMMARY OF THE INVENTION

In the present invention, an encoder sends angular displacement data according to a request command supplied by a control device to the encoder, and the control device supplies a command signal calculated based on the received angular displacement data to a servo amplifier. More concretely, the servo amplifier sends the request command to the encoder according to the request command supplied by the control device to the servo amplifier, and the encoder which has received the request command signal transfers angular displacement data to the control device and to the servo amplifier by serial transmission. The servo amplifier and the control device, that have received the angular displacement data respectively convert the received serial angular displacement data into parallel angular displacement data by the ASIC. After arithmetically operating a rotating speed based on the parallel angular displacement signal and comparing the calculated rotating speed with a set speed value, the control device outputs a command signal to the servo amplifier. The servo amplifier controls the servomotor by comparing the command signal in connection with the angular displacement data.

DESCRIPTION OF THE PREFERRED EMBODIMENT

Figure 1:
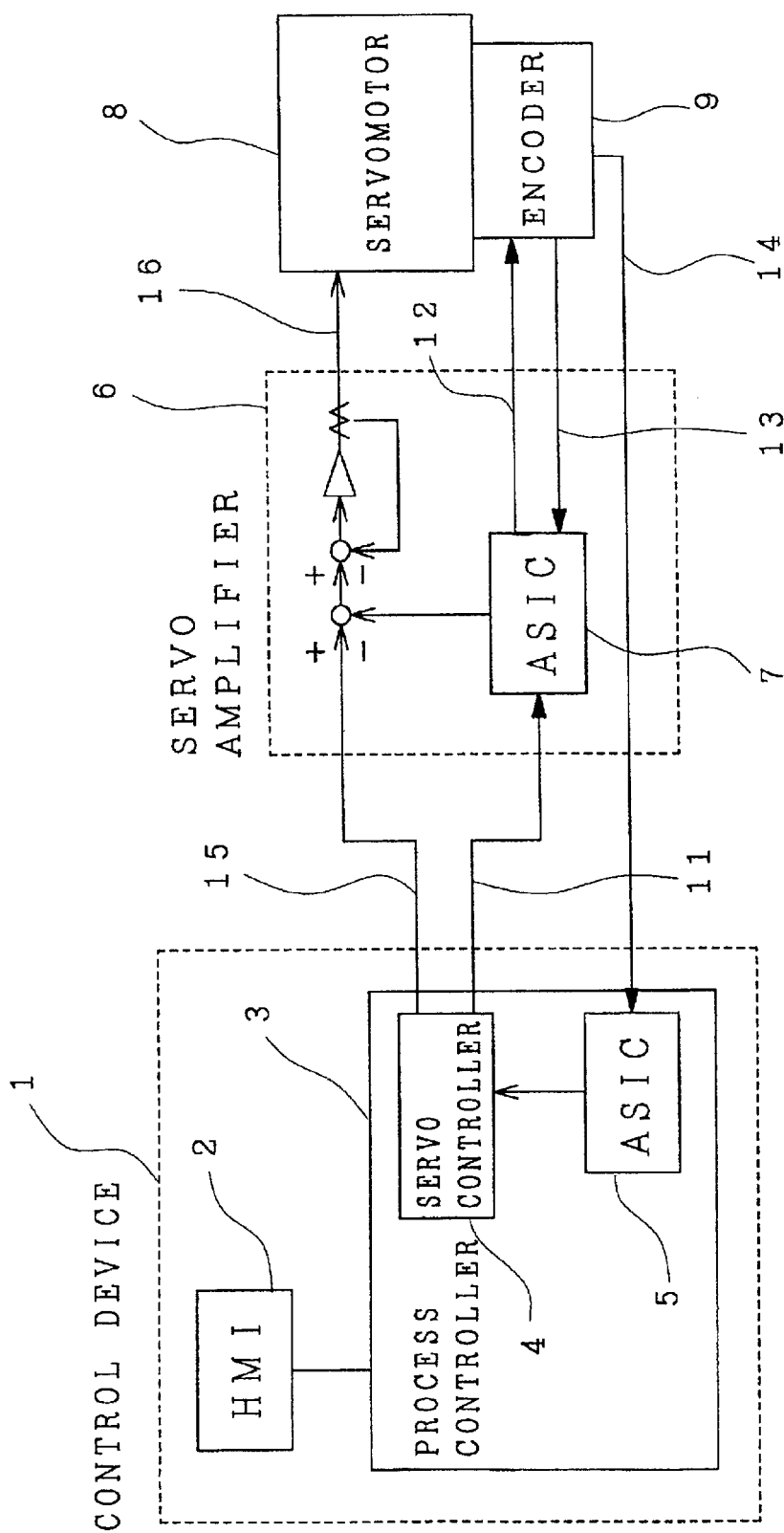
FIG. 1 is a block diagram of a servomotor control method according to the present invention.
Figure 2:
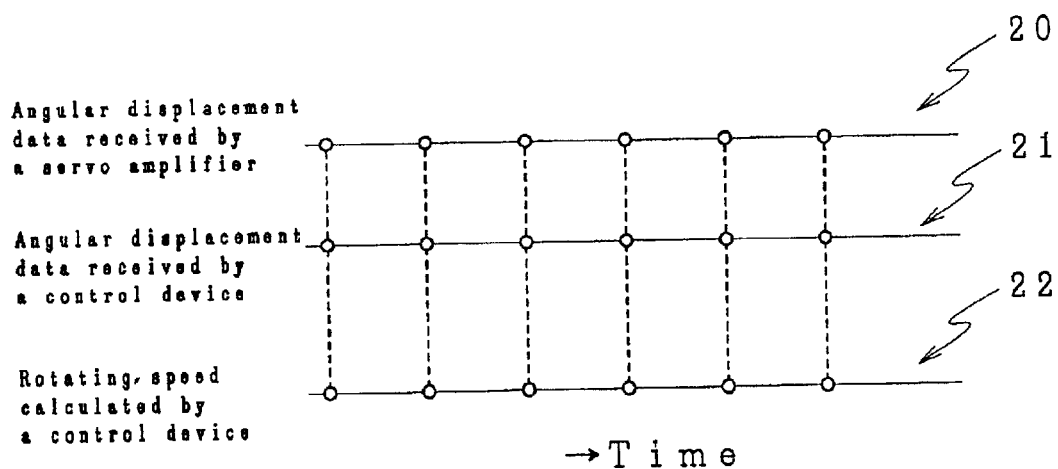
FIG. 2 is an explanatory view of a control state of a servomotor of the present invention by way of example.
Figure 3:
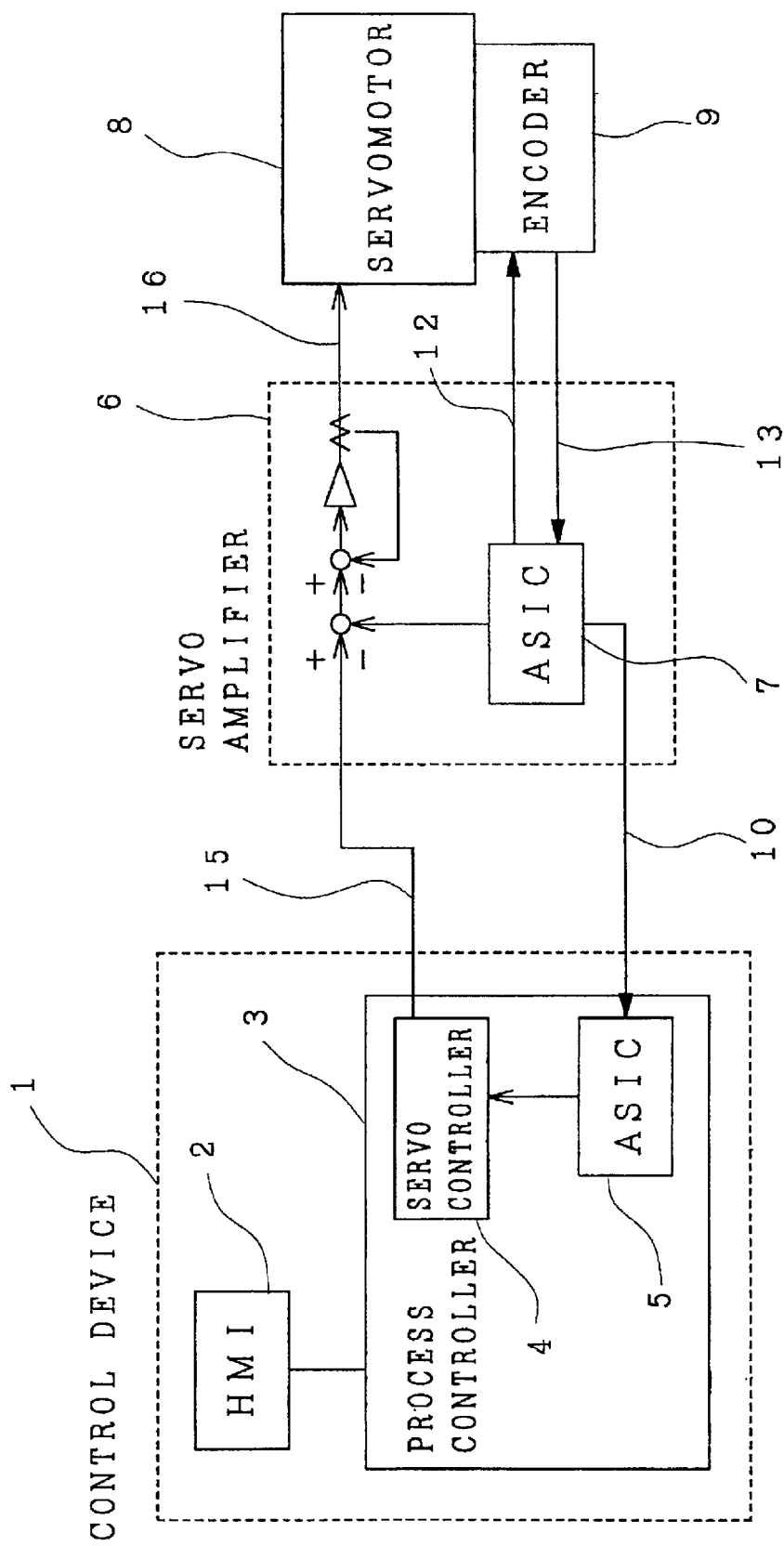
FIG. 3 is a block diagram of a known servomotor control method.
Figure 4:
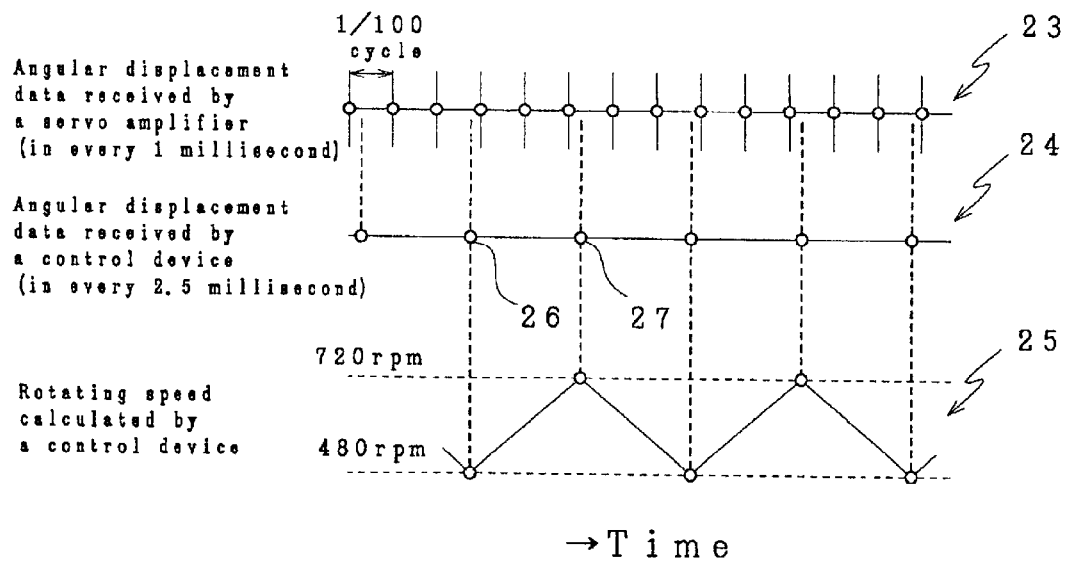
FIG. 4 is an explanatory view of a control state of a known servomotor by way of example.

An embodiment of the present invention will be described below with reference to the drawings. FIG. 1 is a block diagram of a method for controlling a servomotor according to the present invention and FIG. 2 shows an example of a control state thereof. In FIG. 1, devices or elements corresponding to those in FIG. 3 which shows the known control system are indicated by like reference numerals, and no description thereof is given because the operation and effect are basically identical. The encoder 9 is used also as a position detector for the moving member and is preferably of an absolute signal output type, because it is necessary that the angular displacement data is nonvolatile to improve the maneuverability and the safety of an injection molding machine. The resolution of the encoder 9 is not less than 17 bits in view of the accuracy of an injection molding machine.

The request command 11 transmitted from the servo controller 4 of the control device 1 to the servo amplifier 6 is used to require and obtain an instantaneous value of the angular displacement data of the servomotor 8 from the encoder 9, and is sent at each processing cycle determined by a clock frequency of a microprocessor which constitutes the servo controller 4. The ASIC 7 in the servo amplifier 6, which has received the request command 11 transports the request command 12 to the encoder 9 synchronously with the request command 11. The encoder 9 which has received the request command 12 transfers the angular displacement data 13 to the ASCI 7 of the servo amplifier 6, with the present value of the angular displacement of the servomotor 8 being used as serial transmission data and transfers the angular displacement data 14 to the ASCI 5 in the process controller 3 of the control device 1. The ASIC 5 converts the received serial angular displacement data 14 to parallel angular displacement data and transmits the same to the servo controller 4. The servo controller 4 compares the received angular displacement data with a predetermined value for controlling the servomotor 8 and outputs the command signal 15, thus calculated and generated, to control the servomotor 8 in a closed-loop system, to the servo amplifier 6. The arithmetic operation is performed by using program at each process cycle determined by a clock frequency of the microprocessor which constitutes the servo controller 4. The ASIC 7 of the servo amplifier 6 converts the serial angular displacement data transformed from the encoder 9, into parallel angular displacement data. After the servo amplifier 6 compares the angular displacement data with the command signal 15 and performs calculation in the positional closed-loop, the servo amplifier 6 amplifies the power while feedbacking the current to produce driving current 16.

An example of control by the present invention is described with reference to FIG. 2. The graph 20 shows an angular displacement data train of the servomotor 8, which is received by the servo amplifier 6 after the request command 12 is sent to the encoder 9 by the ASIC 7. The graph 21 shows an angular displacement data train of the servomotor 8, which is received from the encoder 9 at each processing cycle by the control device 1 (the servo controller 4). The control device 1 (the servo controller 4) calculates a rotating speed, based on a difference between the received data and the previous data, i.e., an angular displacement and the time for the displacement, each time the angular displacement data is received. The graph 22 shows a rotating speed of the servomotor 8, calculated by the control device 1 at each processing cycle. Because a series of operations are carried out in an each same processing cycle, from the transmission of the request command 11 to the receipt of the angular displacement data 14, the angular displacement value when the rotating speed is calculated by the control device 1 is identical to the actual angular displacement. If the servomotor 8 rotates constantly, the rotating speed value is stably constant accordingly, as shown in the graph 22 and does not change oscillatingly.

In the control of the present invention as described above, the calculated and detected rotating speed value of the servomotor is never different from the actual rotating speed and the rotating speed of the servomotor does not change abnormally. Therefore, damage, such as abnormal wear of ball screws or ball nuts, can be prevented and a synchronous operation of plural servomotors which drive the moving members can be performed safely and veryly precisely.

What is claimed is:

1. A method for controlling a servomotor in an injection molding machine comprising a servo amplifier which outputs a driving current according to a command signal transmitted from a control device and a servomotor having an encoder which is driven by said driving current, wherein the servo amplifier transmits a request command to the encoder according to a request command supplied from the control device to the servo amplifier; the encoder which has received the request command signal transfers said angular displacement data to the servo amplifier and to the control device by serial transmission; the servo amplifier and the control device, that have received the angular displacement data convert the received respective serial angular displacement data into parallel angular displacement data; the control device calculates a rotating speed based on the parallel angular displacement signal, compares the same with a set speed value and outputs a command signal to the servo amplifier; and the servo amplifier controls the servomotor by comparing said command signal with said angular displacement data.

2. A method for controlling a servomotor according to claim 1, wherein the conversion from the serial angular displacement data into the parallel angular displacement data is performed by an integrated circuit for specific purposes.

* * * * *